United States Patent
An

(10) Patent No.: US 12,525,716 B2
(45) Date of Patent: Jan. 13, 2026

(54) ANTENNA APPARATUS AND MOBILE TERMINAL

(71) Applicant: JRD COMMUNICATION (SHENZHEN) LTD., Guangdong (CN)

(72) Inventor: Xinrong An, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 188 days.

(21) Appl. No.: 18/254,197

(22) PCT Filed: Dec. 9, 2020

(86) PCT No.: PCT/CN2020/134906
§ 371 (c)(1),
(2) Date: May 24, 2023

(87) PCT Pub. No.: WO2022/110309
PCT Pub. Date: Jun. 2, 2022

(65) Prior Publication Data
US 2024/0006767 A1    Jan. 4, 2024

(30) Foreign Application Priority Data
Nov. 26, 2020  (CN) .......................... 202011350394.5

(51) Int. Cl.
*H01Q 5/50*   (2015.01)
*H01Q 5/28*   (2015.01)
(Continued)

(52) U.S. Cl.
CPC ................. *H01Q 5/50* (2015.01); *H01Q 5/28* (2015.01); *H01Q 5/335* (2015.01); *H04B 1/401* (2013.01)

(58) Field of Classification Search
CPC . H01Q 5/50; H01Q 5/28; H01Q 5/335; H04B 1/401; H04B 1/0053; H04B 1/0458;
(Continued)

(56) References Cited

U.S. PATENT DOCUMENTS

2003/0100333 A1    5/2003  Standke et al.
2005/0009482 A1    1/2005  Han
(Continued)

FOREIGN PATENT DOCUMENTS

CN    1615039 A    5/2005
CN    101646030 A    2/2010
(Continued)

OTHER PUBLICATIONS

International Search Report in International application No. PCT/CN2020/134906,mailed on Aug. 31, 2021.
(Continued)

*Primary Examiner* — Seung H Lee
(74) *Attorney, Agent, or Firm* — PV IP PC; Wei Te Chung

(57) ABSTRACT

An antenna apparatus includes an antenna, a first matching circuit and a second matching circuit, which are connected to the antenna, and an antenna switching apparatus, which is connected to the first matching circuit and the second matching circuit. Within the same time, only one of the first matching circuit and the second matching circuit is in operation. Operating frequency-band signals of the first matching circuit and the second matching circuit on the antenna are switched by the antenna switching apparatus, so as to be used at staggered times, thereby ensuring that operating frequency-band signals of the first matching circuit and the second matching circuit can be normally used in different scenarios, and effectively improving a performance of the antenna.

15 Claims, 2 Drawing Sheets

(51) Int. Cl.
*H01Q 5/335* (2015.01)
*H04B 1/401* (2015.01)

(58) Field of Classification Search
CPC .......... H04B 1/18; H04W 4/33; H04W 84/12; H04W 88/06
See application file for complete search history.

(56) References Cited

U.S. PATENT DOCUMENTS

| | | | |
|---|---|---|---|
| 2012/0003944 | A1 | 1/2012 | Bai |
| 2014/0148097 | A1 | 5/2014 | Kao |
| 2015/0061954 | A1* | 3/2015 | Chang .................... H01Q 5/335 343/767 |
| 2018/0183151 | A1 | 6/2018 | Zhao et al. |
| 2022/0115768 | A1* | 4/2022 | Oh ......................... H01Q 1/243 |

FOREIGN PATENT DOCUMENTS

| | | |
|---|---|---|
| CN | 201805459 U | 4/2011 |
| CN | 201947322 U | 8/2011 |
| CN | 102637964 A | 8/2012 |
| CN | 104184488 A | 12/2014 |
| CN | 104795636 A | 7/2015 |
| CN | 204991941 U | 1/2016 |
| CN | 106711612 A | 5/2017 |
| CN | 107947822 A | 4/2018 |
| CN | 108134202 A | 6/2018 |
| CN | 111211421 A | 5/2020 |
| CN | 111710957 A | 9/2020 |
| JP | 2018182505 A | 11/2018 |
| KR | 20040023423 A | 3/2004 |
| WO | WO-2020259296 A1 * | 12/2020 ............. H04B 1/006 |

OTHER PUBLICATIONS

Written Opinion of the International Search Authority in International application No. PCT/CN2020/134906, mailed on Aug. 31, 2021.
Chinese Office Action issued in corresponding Chinese Patent Application No. 202011350394.5 dated Jul. 9, 2021, pp. 1-8.
European Search Report in European application No. 20963197.7, mailed on Sep. 25, 2024.

* cited by examiner

ANTENNA APPARATUS AND MOBILE TERMINAL

CROSS REFERENCE TO RELATED APPLICATIONS

This application is a US national phase application based upon an International Application No. PCT/CN2020/134906, filed on Dec. 9, 2020, which claims priority to Chinese Patent Application No. 202011350394.5, filed on Nov. 26, 2020, and entitled "ANTENNA APPARATUS AND MOBILE TERMINAL". The entire disclosures of the above application are incorporated herein by reference.

TECHNICAL FIELD

The present application relates to the technical field of mobile communication, and in particular to an antenna apparatus and a mobile terminal.

BACKGROUND

More and more mobile terminals currently on the market support GPS L5 (1176.45 MHz) frequency band and WiFi MIMO function. Such devices are usually 5G mobile terminals, and a large number of antennas need to be arranged inside the mobile terminal, therefore, the space for antennas is becoming increasingly insufficient. In addition, most of the antennas in the mobile terminal can only debug a single resonance (meaning that the resonance has a good efficiency, such as >20%) due to insufficient size and length or the inability to route wires. Furthermore, the space of a multi-frequency antenna is larger than that of a single-frequency antenna.

In addition, in mobile terminals, GPS L5 frequency band and WiFi MIMO function usually only play an auxiliary role, or signal enhancements to existing features. Therefore, when the antenna space is allocated, the headroom given is relatively small, and the debuggability is relatively poor.

SUMMARY OF INVENTION

Technical Problem

Embodiments of the present application provide an antenna apparatus and a mobile terminal to solve an issue of relatively poor debuggability of multi-frequency antennas in the case of a small clear space.

Technical Solution

According to one aspect of the present application, an embodiment of the present application provides an antenna apparatus, including: an antenna; a first matching circuit and a second matching circuit, wherein the first matching circuit and the second matching circuit are connected to the antenna; and an antenna switching apparatus connected to the first matching circuit and the second matching circuit; wherein at the same time, only one matching circuit in the first matching circuit and the second matching circuit is in a working state. Further, a working frequency band of the first matching circuit is used for a GPS signal; and a working frequency band of the second matching circuit is used for a wifi signal.

Further, a working frequency band of the first matching circuit is a frequency band corresponding to a GPS signal; and a working frequency band of the second matching circuit is a frequency band corresponding to a wifi signal.

Further, a working frequency-band signal of the first matching circuit is used for the GPS signal to work indoors; and a working frequency-band signal of the second matching circuit is used for a wifi signal to work outdoors.

Further, a first switch; wherein the first switch is connected to transmission lines of working frequency-band signals of the first matching circuit and the second matching circuit.

Further, the antenna switching apparatus further comprises: a second switch, wherein the second switch is connected to the first switch, and the second switch is respectively connected to the first matching circuit and the second matching circuit.

Further, the antenna switching apparatus further comprises: a switch connected to the second matching circuit; wherein the first matching circuit and the second matching circuit are connected in parallel.

Further, the antenna switching apparatus further comprises: an adjustable capacitor connected to the first switch; wherein an antenna resonant frequency is tuned according to a capacitance change of the adjustable capacitor, so as to adjust the working frequency-band signals of the first matching circuit and the second matching circuit.

Further, the working frequency bands of the first matching circuit and the second matching circuit are adjusted through the adjustable capacitor.

Further, when the working frequency-band signals of the first matching circuit and the second matching circuit exist at the same time, a working priority of the first matching circuit is higher than a working priority of the second matching circuit.

According to another aspect of the present application, the present application provides a mobile terminal, including the above antenna apparatus.

Beneficial Effect of the Invention

Beneficial Effect

The present application provides a data acquisition method and system, a storage medium, and a mobile terminal. The beneficial effect of this application includes that: The working frequency-band signals of the first matching circuit and the second matching circuit on the antenna are switched by the antenna switching apparatus so as to be used at staggered times. Therefore, it is ensured that the working frequency-band signals of the first matching circuit and the second matching circuit can be used normally in different scenarios, and the performance of the antenna is effectively improved.

BRIEF DESCRIPTION OF THE DRAWINGS

Description of Drawings

In order to illustrate the technical solutions in the embodiments of the present invention more clearly, the following will briefly introduce the drawings that need to be used in the description of the embodiments. Obviously, the drawings in the following description are only some embodiments of the present invention. For those skilled in the art, other drawings can also be obtained based on these drawings without any creative effort.

Figure 1:
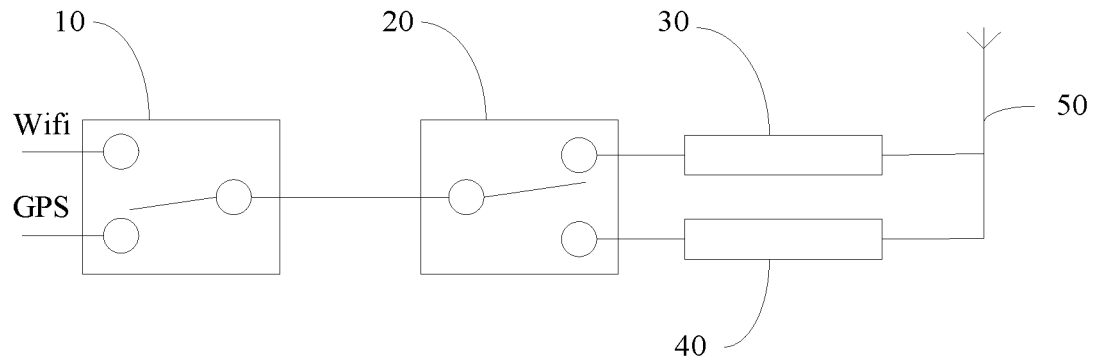

FIG. 1 is a schematic structural diagram of an antenna apparatus provided in a first embodiment of the present application.

Figure 2:
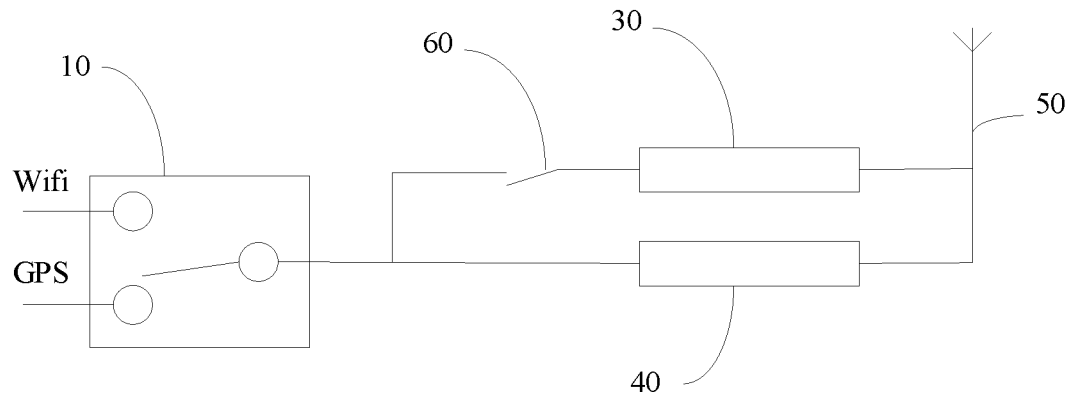

FIG. 2 is a schematic structural diagram of an antenna apparatus provided in a second embodiment of the present application.

Figure 3:
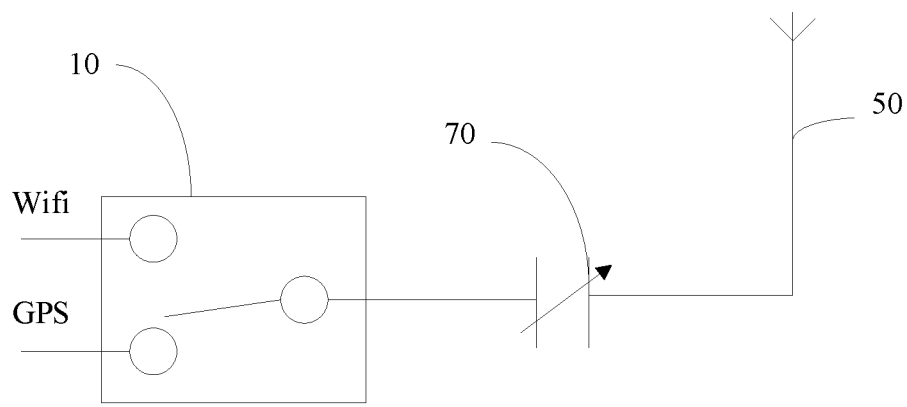

FIG. 3 is a schematic structural diagram of an antenna apparatus provided in a third embodiment of the present application.

Figure 4:
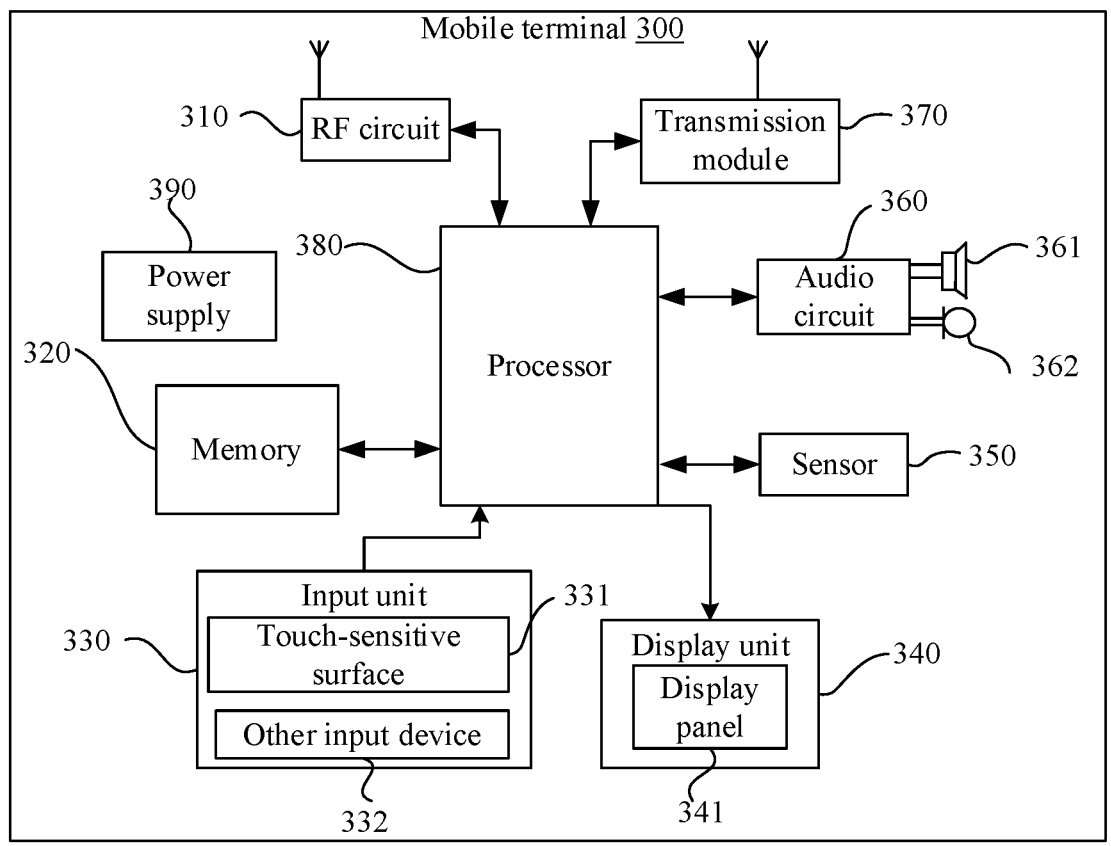

FIG. 4 is a schematic structural diagram of a mobile terminal provided by an embodiment of the present application.

DETAILED DESCRIPTION OF THE PREFERRED EMBODIMENTS

Embodiments of the Present Invention

The following will clearly and completely describe the technical solutions in the embodiments of the present invention with reference to the drawings in the embodiments of the present invention. Apparently, the described embodiments are only some of the embodiments of the present invention, but not all of them. Based on the embodiments of the present invention, all other embodiments obtained by those skilled in the art without creative efforts fall within the protection scope of the present invention.

As shown in FIG. 1, which is a schematic structural diagram of an antenna 50 device provided in a first embodiment of the present application, including: an antenna 50, an antenna switching apparatus, a first matching circuit 40, and a second matching circuit 30.

The first matching circuit 40 and the second matching circuit 30 are connected to the antenna 50, and the antenna switching apparatus is connected to the first matching circuit 40 and the second matching circuit 30.

The working frequency band of the first matching circuit 40 is the frequency band corresponding to the GPS signal, and the working frequency band of the second matching circuit is the frequency band corresponding to the wifi signal. Understandably, in some other embodiments, it may also include that: the working frequency band of the first matching circuit is the frequency band corresponding to the wifi signal, and the working frequency band of the second matching circuit 30 is the frequency band corresponding to the GPS signal.

In the first embodiment, the antenna switching apparatus includes: a first switch 10 and a second switch 20. The first switch 10 is connected to the transmission lines of the working frequency-band signals of the first matching circuit and the second matching circuit 30. The first switch 10 is connected to the second switch 20, and the second switch 20 is connected to the first matching circuit 40 and the second matching circuit 30.

The working frequency-band signal of the first matching circuit 40 is used for a GPS signal to work indoors, and the working frequency-band signal of the second matching circuit 30 is used for a wifi signal to work outdoors, thereby ensuring that the working frequency-band signals of the first matching circuit 40 and the second matching circuit 30 can be used normally in different scenarios, and the performance of the antenna 50 is effectively improved.

When the working frequency-band signals of the first matching circuit 40 and the second matching circuit 30 exist at the same time, the working frequency-band signal of the first matching circuit 40 is preferentially transmitted. At the same time, only one matching circuit in the first matching circuit 40 and the second matching circuit 30 is in working state.

The beneficial effects of the first embodiment of the present application include that: The working frequency-band signals of the first matching circuit and the second matching circuit on the antenna are switched by the antenna switching apparatus to be used at staggered times. Therefore, it is ensured that the working frequency-band signals of the first matching circuit and the second matching circuit can be used normally in different scenarios, and the performance of the antenna is effectively improved.

As shown in FIG. 2, which is a schematic structural diagram of an antenna 50 device provided in a second embodiment of the present application, including: an antenna 50, an antenna switching apparatus, a first matching circuit 40, and a second matching circuit 30.

The first matching circuit 40 and the second matching circuit 30 are connected to the antenna 50. In other words, the antenna switching apparatus is connected to the first matching circuit 40 and the second matching circuit 30.

The working frequency band of the first matching circuit 40 is the frequency band corresponding to the GPS signal, and the working frequency band of the second matching circuit is the frequency band corresponding to the wifi signal.

In the second embodiment, the antenna switching apparatus further includes: a first switch 10 and a switch 60. The first switch 10 is connected to the transmission line of the working frequency-band signal of the first matching circuit and the second matching circuit, the switch 60 is connected to the second matching circuit 30, and the first matching circuit 40 and the second matching circuit 30 are connected in parallel.

The working frequency-band signal of the first matching circuit 40 is used for the GPS signal to work indoors, and the working frequency-band signal of the second matching circuit 30 is used for the wifi signal to work outdoors. Therefore, it is ensured that the working frequency-band signals of the first matching circuit 40 and the second matching circuit 30 can be used normally in different scenarios, and the performance of the antenna 50 is effectively improved.

When the working frequency-band signals of the first matching circuit 40 and the second matching circuit 30 exist at the same time, the working frequency-band signal of the first matching circuit 40 is preferentially transmitted. At the same time, only one matching circuit in the first matching circuit 40 and the second matching circuit 30 is in working state.

The beneficial effects of the second embodiment of the present application include that: The working frequency-band signals of the first matching circuit and the second matching circuit on the antenna are switched by the antenna switching apparatus so as to be used at staggered times. Therefore, it is ensured that the working frequency-band signals of the first matching circuit and the second matching circuit can be used normally in different scenarios, and the performance of the antenna is effectively improved.

As shown in FIG. 3, which is a schematic structural diagram of an antenna 50 device provided in a third embodiment of the present application, including: an antenna 50, an antenna switching apparatus, a first matching circuit 40, and a second matching circuit 30.

The first matching circuit 40 and the second matching circuit 30 are connected to the antenna 50. In other words, the antenna switching apparatus is connected to the first matching circuit 40 and the second matching circuit 30.

The working frequency band of the first matching circuit 40 is the frequency band corresponding to the GPS signal, and the working frequency band of the second matching circuit is the frequency band corresponding to the wifi signal.

In the third embodiment, the antenna switching apparatus includes: a first switch 10 and an adjustable capacitor 70. The first switch 10 is connected to the transmission lines of the working frequency-band signals of the first matching circuit and the second matching circuit.

The adjustable capacitor 70 is connected to the first switch 10. The antenna resonant frequency is tuned according to the capacitance change of the adjustable capacitor 70, so as to adjust the working frequency-band signals of the first matching circuit 30 and the second matching circuit 40.

The working frequency-band signal of the first matching circuit 40 is used for the GPS signal to work indoors, and the working frequency-band signal of the second matching circuit 30 is used for the wifi signal to work outdoors. Therefore, it is ensured that the working frequency-band signals of the first matching circuit 40 and the second matching circuit 30 can be used normally in different scenarios, and the performance of the antenna 50 is effectively improved.

When the working frequency-band signals of the first matching circuit 40 and the second matching circuit 30 exist at the same time, the working frequency-band signal of the first matching circuit 40 is preferentially transmitted. At the same time, only one matching circuit in the first matching circuit 40 and the second matching circuit 30 is in working state.

The beneficial effects of the third embodiment of the present application include that: The working frequency-band signals of the first matching circuit and the second matching circuit on the antenna are switched by the antenna switching apparatus so as to be used at staggered times. Therefore, it is ensured that the working frequency-band signals of the first matching circuit and the second matching circuit can be used normally in different scenarios, and the performance of the antenna is effectively improved.

The embodiment of the present application also provides a mobile terminal 300. The mobile terminal 300 may be a device such as a smart phone or a tablet computer, specifically, as shown in FIG. 4.

Memory 320 may include a high-speed random access memory, and may also include a non-volatile memory such as one or more magnetic storage devices, flash memory, or other non-volatile solid-state memory. In some examples, the memory 320 may further include memories located remotely from a processor 380. These remote memories may be connected to the mobile terminal 300 through a network. Examples of the aforementioned networks include, but are not limited to, the Internet, intranets, local area networks, mobile communication networks, and combinations thereof.

The input unit 330 can be used to receive input digital or character information, and the input unit 330 can generate keyboard, mouse, joystick, optical or trackball signal input related to user setting and function control. Specifically, the input unit 330 may include a touch-sensitive surface 331 and other input device 332. The touch-sensitive surface 331, also referred to as a touch screen or touchpad, can collect user touch operations on or near it (for example, the user uses any suitable object or accessory such as a finger, a stylus, etc. on the touch-sensitive surface 331 or on the operation near the touch-sensitive surface 331), and drive the corresponding connection device according to the preset program. Optionally, the touch-sensitive surface 331 may include two parts: a touch detection device and a touch controller. The touch detection device detects the orientation of the user's touch, detects the signal brought by the touch operation, and transmits the signal to the touch controller. The touch controller receives touch information from the touch detection device, converts it into contact coordinates, and then sends it to the processor 380, and can receive and execute commands sent by the processor 380. In addition, the touch-sensitive surface 331 may be implemented in various types such as resistive, capacitive, infrared, and surface acoustic wave. In addition to the touch-sensitive surface 331, the input unit 330 may also include other input devices 332. Specifically, other input devices 332 may include, but are not limited to, one or more of physical keyboards, function keys (such as volume control keys, switch keys, etc.), trackballs, mice, joysticks, and the like.

The display unit 340 may be used to display information input by or provided to the user and various graphical user interfaces of the mobile terminal 300. These graphical user interfaces can be composed of graphics, text, icons, videos and any combination thereof. The display unit 340 may include a display panel 341. Optionally, the display panel 341 may be configured in a form of LCD (liquid crystal display), OLED (organic light-emitting diode), or the like. Further, the touch-sensitive surface 331 can cover the display panel 341. When the touch-sensitive surface 331 detects a touch operation on or near it, it transmits to the processor 380 to determine the type of the touch event. Then the processor 380 provides corresponding visual output on the display panel 341 according to the type of the touch event. Although in FIG. 4, the touch-sensitive surface 331 and the display panel 341 are used as two independent components to realize input and output functions, in some embodiments, the touch-sensitive surface 331 can be integrated with the display panel 341 for input and output functions.

The mobile terminal 300 may also include at least one sensor 350, such as a light sensor, a motion sensor, and other sensors. Specifically, the light sensor may include an ambient light sensor and a proximity sensor. The ambient light sensor can adjust the brightness of the display panel 341 according to the brightness of the ambient light. The proximity sensor can turn off the display panel 341 and/or the backlight when the mobile terminal 300 is moved to the ear. As a kind of motion sensor, the gravity acceleration sensor can detect the magnitude of acceleration in all directions (generally three axes). It can detect the magnitude and direction of gravity when it is stationary, and can be used for applications that recognize the posture of the mobile phone (such as horizontal and vertical screen switching, related games, magnetometer posture calibration), vibration recognition related functions (such as pedometer, tap), etc. As for other sensors such as a gyroscope, a barometer, a hygrometer, a thermometer, and an infrared sensor that can be configured on the mobile terminal 300, details will not be repeated here.

The audio circuit 360, the speaker 361 and the microphone 362 can provide an audio interface between the user and the mobile terminal 300. The audio circuit 360 can transmit the electrical signal converted from the received audio data to the speaker 361, and the speaker 361 converts it into an audio signal for output. On the other hand, the microphone 362 converts the collected sound signal into an electrical signal, which is converted into audio data after being received by the audio circuit 360. After the audio data is processed by the output processor 380, it is sent to another terminal through the RF circuit 310, for example. Alternatively, the audio data is output to the memory 320 for further processing. The audio circuit 360 may also include an earphone jack to provide communication between an external earphone and the mobile terminal 300.

The processor 380 is the control center of the mobile terminal 300 and uses various interfaces and lines to connect various parts of the entire mobile phone. By running or executing software programs and/or modules stored in the memory 320, and calling data stored in the memory 320, various functions of the mobile terminal 300 are executed and data is processed, so as to monitor the mobile phone as a whole. Optionally, the processor 380 may include one or more processing cores. In some embodiments, the processor 380 may integrate an application processor and a modem processor. The application processor mainly handles the operating system, user interface and application programs, etc., and the modem processor mainly handles wireless communication. It can be understood that the foregoing modem processor may not be integrated into the processor 380.

The mobile terminal 300 further includes a power supply 390 (such as a battery) for powering various components. In some embodiments, the power supply can be logically connected to the processor 380 through a power management system, so that functions such as charging, discharging, and power consumption management can be implemented through the power management system. The power supply 390 may also include one or more DC or AC power supplies, recharging systems, power failure detection circuits, power converters or inverters, power status indicators, and other arbitrary components.

Although not shown, the mobile terminal 300 may also include a camera (such as a front camera, a rear camera), a Bluetooth module, etc., which will not be repeated here.

During specific implementation, each of the above modules may be implemented as an independent entity or may be combined arbitrarily to be implemented as the same or several entities. For the specific implementation of the above modules, reference may be made to the foregoing method embodiments, and details are not repeated here.

In this description, specific examples are used to illustrate the principles and implementation methods of the present application, and the descriptions of the above embodiments are only used to help understand the technical solutions and core ideas of the present application. Those of ordinary skill in the art should understand that they can still modify the technical solutions described in the foregoing embodiments or perform equivalent replacements for some of the technical features. However, these modifications or replacements do not make the essence of the corresponding technical solutions depart from the scope of the technical solutions of the embodiments of the present application.

What is claimed is:

1. An antenna apparatus, comprising:
    an antenna;
    a first matching circuit and a second matching circuit, wherein the first matching circuit and the second matching circuit are connected to the antenna; and
    an antenna switching apparatus connected to the first matching circuit and the second matching circuit;
    wherein a working frequency band of the first matching circuit is a frequency band corresponding to a GPS signal and is configured to operate in an indoor environment; and a working frequency band of the second matching circuit is a frequency band corresponding to a WiFi signal and is configured to operate in an outdoor environment; wherein the working frequency-band signal of the first matching circuit is used for the GPS signal and operates indoors, and the working frequency-band signal of the second matching circuit is used for the WiFi signal and operates outdoors; wherein the working frequency-band signals of the first matching circuit and the second matching circuit are switched via the antenna switching apparatus; wherein at the same time, only one matching circuit in the first matching circuit and the second matching circuit is in a working state;
    wherein the switching of the working frequency-band signals is performed dynamically according to a detected usage scenario; and
    wherein the antenna switching apparatus comprises an adjustable capacitor that tunes the antenna resonant frequency according to the detected usage scenario.

2. The antenna apparatus of claim 1, wherein the antenna switching apparatus comprises:
    a first switch;
    wherein the first switch is connected to transmission lines of working frequency-band signals of the first matching circuit and the second matching circuit.

3. The antenna apparatus of claim 2, wherein the antenna switching apparatus further comprises: a second switch, wherein the second switch is connected to the first switch, and the second switch is respectively connected to the first matching circuit and the second matching circuit.

4. The antenna apparatus of claim 2, wherein the antenna switching apparatus further comprises: a switch connected to the second matching circuit;
    wherein the first matching circuit and the second matching circuit are connected in parallel.

5. The antenna apparatus of claim 2, wherein the antenna switching apparatus further comprises: an adjustable capacitor connected to the first switch;
    wherein an antenna resonant frequency is tuned according to a capacitance change of the adjustable capacitor, so as to adjust the working frequency-band signals of the first matching circuit and the second matching circuit.

6. The antenna apparatus of claim 5, wherein the working frequency bands of the first matching circuit and the second matching circuit are adjusted through the adjustable capacitor.

7. The antenna apparatus of claim 1, wherein when the working frequency-band signals of the first matching circuit and the second matching circuit exist at the same time, a working priority of the first matching circuit is higher than a working priority of the second matching circuit.

8. A mobile terminal, comprising:
    an antenna apparatus comprising:
        an antenna;
        a first matching circuit and a second matching circuit, wherein the first matching circuit and the second matching circuit are connected to the antenna; and
        an antenna switching apparatus connected to the first matching circuit and the second matching circuit;
        wherein a working frequency band of the first matching circuit is a frequency band corresponding to a GPS signal and is configured to operate in an indoor environment; and a working frequency band of the second matching circuit is a frequency band corresponding to a WiFi signal and is configured to operate in an outdoor environment; wherein the working frequency-band signal of the first matching circuit is used for the GPS signal and operates indoors, and the working frequency-band signal of the second matching circuit is used for the WiFi signal and operates outdoors; wherein the working frequency-band signals of the first matching circuit and the second matching circuit are switched via the antenna switching apparatus; wherein at the same time, only one matching circuit in the first matching circuit and the second matching circuit is in a working state;

wherein the switching of the working frequency-band signals is performed dynamically according to a detected usage scenario; and wherein the antenna switching apparatus comprises an adjustable capacitor that tunes the antenna resonant frequency according to the detected usage scenario.

9. The mobile terminal of claim 8, wherein the antenna switching apparatus comprises:

a first switch;

wherein the first switch is connected to transmission lines of working frequency-band signals of the first matching circuit and the second matching circuit.

10. The mobile terminal of claim 9, wherein the antenna switching apparatus further comprises: a second switch, wherein the second switch is connected to the first switch, and the second switch is respectively connected to the first matching circuit and the second matching circuit.

11. The mobile terminal of claim 9, wherein the antenna switching apparatus further comprises: a switch connected to the second matching circuit;

wherein the first matching circuit and the second matching circuit are connected in parallel.

12. The mobile terminal of claim 9, wherein the antenna switching apparatus further comprises: an adjustable capacitor connected to the first switch;

wherein an antenna resonant frequency is tuned according to a capacitance change of the adjustable capacitor, so as to adjust the working frequency-band signals of the first matching circuit and the second matching circuit.

13. The mobile terminal of claim 12, wherein the working frequency bands of the first matching circuit and the second matching circuit are adjusted through the adjustable capacitor.

14. The mobile terminal of claim 8, wherein when the working frequency-band signals of the first matching circuit and the second matching circuit exist at the same time, a working priority of the first matching circuit is higher than a working priority of the second matching circuit.

15. The mobile terminal of claim 8, wherein the mobile terminal comprises a device a smart phone or a tablet computer.

* * * * *